Figure 1:
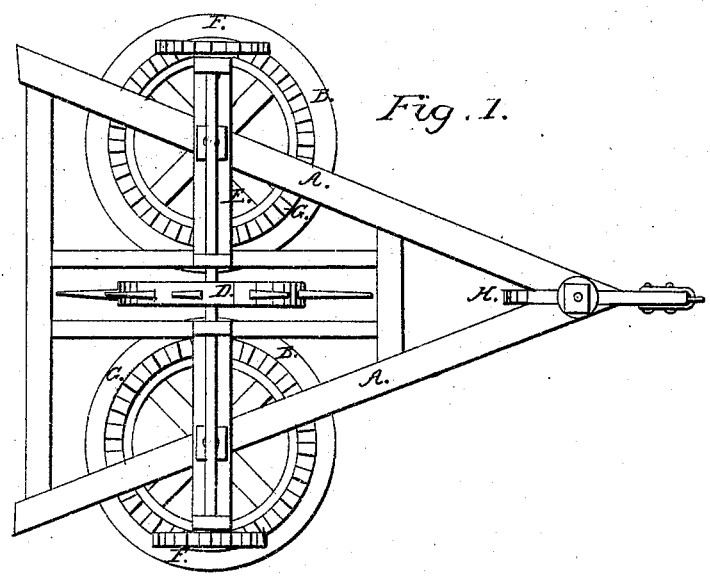

ROUTH & VAUGHN.
Revolving Harrow.

No. 21,153.  Patented Aug. 10, 1858.

UNITED STATES PATENT OFFICE.

J. ROUTH AND A. VAUGHN, OF GRAYVILLE, ILLINOIS.

IMPROVEMENT IN HARROWS.

Specification forming part of Letters Patent No. 21,153, dated August 10, 1858.

*To all whom it may concern:*

Be it known that we, JEREMIAH ROUTH and ABEL VAUGHN, of Grayville, in the county of White and State of Illinois, have invented a new and useful Improvement in Rotary Harrows, the construction and operation of which we have described in the following specification and illustrated in the accompanying drawings with sufficient clearness to enable competent and skillful workmen in the arts to which it pertains or is most nearly allied to make and use our invention.

There have been various devices contrived for giving rotation to horizontal wheels for harrowing purposes, among which may be mentioned toothed vertical wheels, so geared to a horizontal wheel as to by their rotation, caused by their hold upon the soil, give motion to the horizontal wheel to which they are geared, an example of which arrangement may be found in the harrow of Charles Clareni and Geo. P. Field, patented April 4, 1855. Various other devices have also been resorted to in the construction of harrows to secure the rotation of a horizontal wheel, among which may be mentioned weights and other contrivances to give one side of the wheel an additional dip or deeper hold upon the soil than the other. In all harrows in which there is a single rotating horizontal wheel there is a tendency to side draft; or, in other words, the harrow will not follow directly after the team, which every farmer knows is a very great objection. To obviate this difficulty several harrows have been invented in which this side draft has been neutralized by connecting two rotating wheels and giving them greater dip upon opposite sides, so that the side draft produced by one wheel shall be neutralized by that of its fellow. This arrangement, though a great improvement, is subject to the objection that this deeper hold of one side than the other produces unevenness in the work, which is to be avoided, if possible. To accomplish this purpose is the chief object of our improvement.

Our said invention consists in the combination of two horizontal toothed wheels with a vertical toothed wheel or wheels and appropriate gearing in such a manner that the resistance against the teeth of the vertical wheel shall give rotation to the horizontal wheels in opposite directions, and thus correct the side draft without side dip of the horizontal wheels, as hereinafter described, and represented in the drawings.

Figure 2:
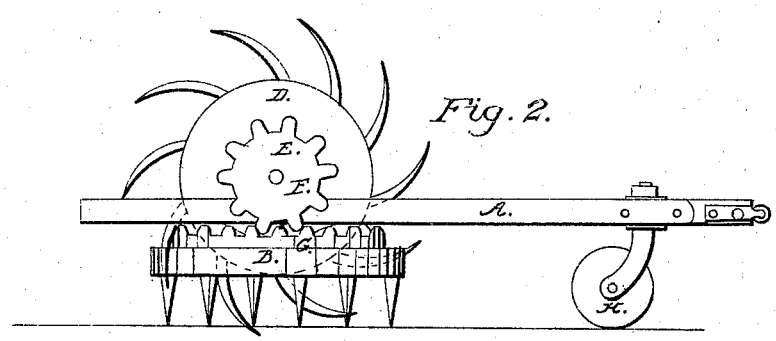
Figure 3:
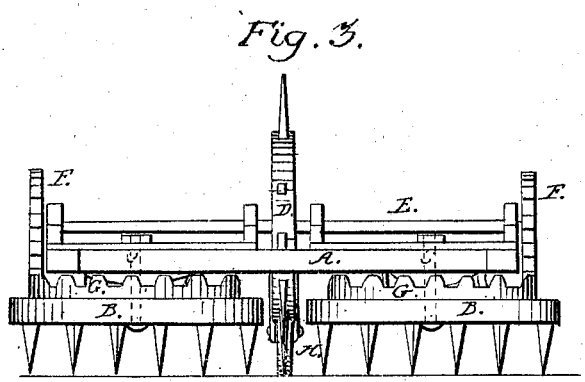

In the accompanying drawings, Figure 1 is a plan of our improved harrow. Fig. 2 is a side elevation of it. Fig. 3 is a rear elevation of it.

A A is the frame.

B B are the two horizontal wheels, which are hung upon vertical (not inclined) journals C C, which are fixed in the frame.

It will be observed by an inspection of the drawings that the points of the teeth fixed in these wheels all touch the same horizontal line. There is no dip to produce their rotation. Consequently they will bear alike upon the whole width of the strip they cover, supposing the ground to be level.

To produce the rotation of these harrows we attach a vertical toothed wheel, D, which we hang upon a shaft, E, as shown, and attach pinions F to this shaft, which pinions mesh into gear-wheels G, attached to the top of the wheels B, as shown in Figs. 2 and 3.

The position and construction of the parts are so clearly shown in the drawings as to render extended description in detail superfluous. It may, however, be well to remark that the wheel D should be located between the wheels B. By thus locating it one wheel is made to give the necessary rotation without producing side draft.

H is a caster-wheel, which we use to secure a square bearing and action of the harrow upon the ground, but which we do not claim as our invention.

We are aware that various harrows have been devised in which rotary motion has been given to a horizontal harrowing-wheel by means of a vertical toothed wheel upon a horizontal shaft, said vertical wheel being so hung as to take hold of the soil in passing over it, and so geared to the horizontal harrowing-wheel as to give it a rotary motion by its own rotation. This we do not claim as our invention.

Having thus fully described our said invention, the improvement which we claim as constituting it, and as having been originally and first invented by us, is—

The combination of the vertical toothed wheel D with the horizontal toothed wheels B B, said wheels being connected by gearing, as described, by which we secure the necessary rotation without either side draft or dip of the horizontal wheels, as set forth.

JEREMIAH ROUTH.
ABEL VAUGHN.

Witnesses:
A. A. WHITE,
MICHAEL SMITH.